US010795238B2

(12) United States Patent
Powell et al.

(10) Patent No.: US 10,795,238 B2
(45) Date of Patent: Oct. 6, 2020

(54) LIGHT REFLECTION

(71) Applicant: Microsoft Technology Licensing, LLC, Redmond, WA (US)

(72) Inventors: Karlton D. Powell, Redmond, WA (US); Lalit Anil Palve, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/460,454

(22) Filed: Jul. 2, 2019

(65) Prior Publication Data

US 2020/0183253 A1 Jun. 11, 2020

Related U.S. Application Data

(60) Provisional application No. 62/776,365, filed on Dec. 6, 2018.

(51) Int. Cl.
*G03B 15/06* (2006.01)

(52) U.S. Cl.
CPC ...... *G03B 15/06* (2013.01); *G03B 2215/0567* (2013.01); *G03B 2215/0582* (2013.01); *G03B 2215/0592* (2013.01)

(58) Field of Classification Search
CPC ............ G03B 15/06; G03B 2215/0567; G03B 2215/0582; G03B 2215/0592
See application file for complete search history.

(56) References Cited

U.S. PATENT DOCUMENTS

| 5,548,120 | A | 8/1996 | Parker et al. |
| 6,464,373 | B1 | 10/2002 | Petrick |
| 7,502,558 | B2 | 3/2009 | Kim et al. |
| 8,025,417 | B2 | 9/2011 | Pohlert et al. |
| 9,470,406 | B2 | 10/2016 | Catalano |
| 10,018,326 | B2 | 7/2018 | Mayer et al. |
| 2007/0070623 | A1 | 3/2007 | Laski |
| 2014/0340484 | A1 | 11/2014 | Pfister et al. |
| 2015/0055348 | A1 | 2/2015 | Kim et al. |
| 2016/0241757 | A1 | 8/2016 | Cheng et al. |
| 2018/0275489 | A1* | 9/2018 | Hung ..................... G03B 15/03 |

FOREIGN PATENT DOCUMENTS

| CN | 104915716 A | 9/2015 |
| EP | 2629003 A1 | 8/2013 |
| WO | 02066891 A1 | 8/2002 |
| WO | 2016184844 A1 | 11/2016 |

OTHER PUBLICATIONS

"International Search Report and Written Opinion Issued in PCT Application No. PCT/US2019/063824", dated Apr. 28, 2020, 11 Pages.

* cited by examiner

*Primary Examiner* — Mary Ellen Bowman
(74) *Attorney, Agent, or Firm* — Rainier Patents, P.S.

(57) ABSTRACT

The description relates to devices that emit light from a light source. One example device can include a reflector extending along an arc and oriented in light receiving relation relative to the light source. The reflector can have a cross-sectional reflector profile taken transverse to the arc that includes a first portion having a swept profile that transitions to a second portion having a reverse swept profile.

20 Claims, 11 Drawing Sheets

SCENE 100

LIGHT REFLECTION

PRIORITY

The present application is a utility patent application that claim priority from U.S. Provisional Patent Application 62/776,365, filed, Dec. 6, 2018, which is incorporated by reference in its entirety.

BACKGROUND

The discussion relates to light-emitting devices, especially dimensionally constrained as well as wide angle light-emitting devices. Examples of such light-emitting devices can include surveillance cameras and video conferencing devices, among others. Traditionally, emitting a desired radiant intensity and/or pattern of light has proven difficult, especially when device dimensions are limited, and the required field of illumination is of significantly wide angle.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

DESCRIPTION

The present discussion relates to light-emitting devices, and especially dimensionally constrained, as well as or including wide angle, light-emitting devices, especially intended to support illumination specifications for vision systems. Proper operation of such devices may depend on emitting light over a field of illumination (FOI) having a defined radiant intensity and/or pattern. The present concepts relate to arcuate swept wavy-petal reflectors (hereinafter, "wavy-petal reflectors") that can work in cooperation with a light source to project light in the field of illumination at the defined radiant intensity and/or defined pattern. The defined pattern can include a horizontal distribution pattern (e.g., angular range and/or distribution within the angular range) as well as a vertical distribution pattern (e.g., radial range) vertical cross-sections through the angular range). The horizontal distribution pattern can be accomplished by an arcuate shape of the arcuate swept wavy-petal reflectors. The vertical distribution pattern can be accomplished by a wavy-petal reflector profile that has a concave shape proximate to the light source and transitions to a convex shape farther from the light source.

Figure 1:
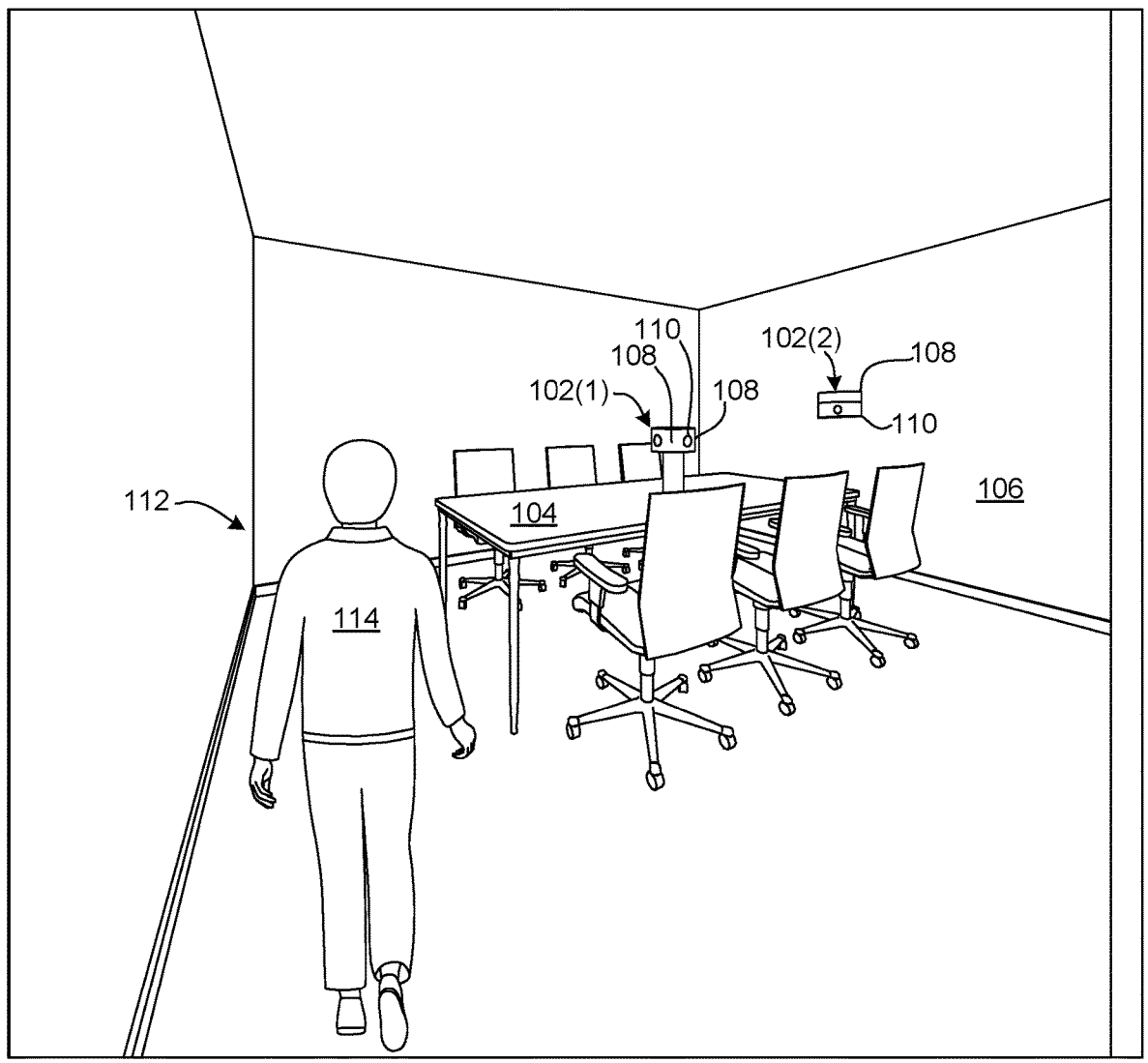
FIG. 1 illustrates an example scenario where arcuate swept wavy-petal reflectors can be employed consistent with some implementations of the present concepts.

FIG. 1 shows an example scenario or scene 100 where light-emitting swept-reflector devices 102 can be employed. This example includes a first light-emitting swept-reflector device 102(1) positioned on a table 104 (e.g., a tabletop video conferencing device) and a second light-emitting swept-reflector device 102(2) mounted on a wall 106. In this example, first light-emitting swept-reflector device 102(1) is manifest as a video conferencing device, while second light-emitting swept-reflector device 102(2) is manifest as a surveillance camera, such as an internet of things (IoT) surveillance camera. In this example, light-emitting swept-reflector devices 102 have vertically constrained dimensions and/or horizontally constrained dimensions. For instance, users sitting around the conference table tend to want light-emitting swept-reflector devices 102(1) to be as small as possible so that it does not block their views of one another.

The first light-emitting swept-reflector device 102(1) can both emit light and sense light reflected from the scene. For instance, the first light-emitting swept-reflector device 102(1) can include light-emitting units or assemblies 108 and light-sensing units or assemblies 110. In this case, the light-sensing assemblies 110 are positioned horizontally between pairs of light-emitting assemblies 108. The light-emitting swept-reflector device 102(1) can cast or emit light in a 360-degree FOI along a plane extending through the device to illuminate the scene 100. On light-emitting swept-reflector device 102(2), the light-emitting assemblies 108 and the light-sensing assemblies 110 are vertically stacked upon one another. The light-emitting swept-reflector device 102(2) can cast or emit light in a 180-degree FOI within a plane extending through the device and intersecting the wall to illuminate the scene and can sense reflected light from the scene.

In the illustrated examples, the light-emitting assemblies 108 can emit light of specified frequencies or wavelengths, such as infrared light (IR), other non-visible frequencies, and/or visible frequencies. The light-sensing assemblies 110 can sense light from the scene at specified frequencies, such as visible and/or non-visible light. For instance, the first light-emitting swept-reflector device 102 could emit IR light and sense both IR and visible light, for example.

The light-emitting swept-reflector device 102(1) can cast or emit light in a 360-degree range along a plane extending through the device to illuminate the scene (e.g., plane parallel to the floor and the table top that passes through the light-emitting swept-reflector device 102(1)). The light can be any type of visible and/or non-visible light. Some of this light may be reflected off of objects 112 in the scene, such as user 114 and be sensed by the light-emitting swept-reflector device 102(1). For instance, reflected IR light emitted from the device may be sensed and used to generate biometric information for the scene, such as for body detection, face detection and/or facial recognition for user authentication purposes. Ambient visible light from the scene may be sensed and utilized to create video streams of the scene for communication to other users in a remote conference room. The biometric information and/or video streams may be used to identify the users in the room while the visual streams may be used for communication purposes. Alternatively, reflected IR light emitted from the device may be sensed and used to generate depth information for the scene. Ambient visible light from the scene may be sensed and utilized to create video streams of the scene for communication to other users in a remote conference room. The biometric information and/or video streams may be used to identify the users in the room while the visual streams may be used for communication purposes.

Design parameters of the light-emitting swept-reflector devices 102 can define a horizontal distribution pattern as well as a vertical distribution pattern of the FOI to illuminate target objects in the scene. Example vertical distribution patterns are described below relative to FIG. 3C. Example horizontal distribution patterns are described below relative to FIG. 5.

The FOI of the light-emitting swept-reflector devices 102 may be directed to a specific region in space. For instance, relative to light-emitting swept-reflector device 102(1), the heads of users entering the room may be target objects. Because the heads of standing users tend to be higher than light-emitting swept-reflector device 102(1), the FOI may have an upward bias (which may substantially correspond to a vision system FOV having an upward bias) to increase a likelihood of illuminating the users' faces. The example described relative to FIG. 3C illustrates an upward bias. In one case where the light-emitting swept-reflector device 102 is configured to be positioned on a conference room table (e.g., a table top video conferencing device), an upward bias angle can be employed to create a vertical field of illumination of, for instance, −30 degrees to +70 degrees to support the camera's offset vertical field of view (VFOV) (e.g., −20 deg to +60 deg from horizontal, for instance).

From one perspective, the light-emitting swept-reflector devices 102 can define a location of a field of illumination, the horizontal configuration of the field of illumination, and/or the vertical configuration of the field of illumination. These aspects are described in more detail below. Note that while the illustrated light-emitting swept-reflector devices 102 include both a light-emitting capability and a light-sensing capability, other light-emitting swept-reflector devices 102 may include a light-emitting capability without a light-sensing capability.

Figure 2A:
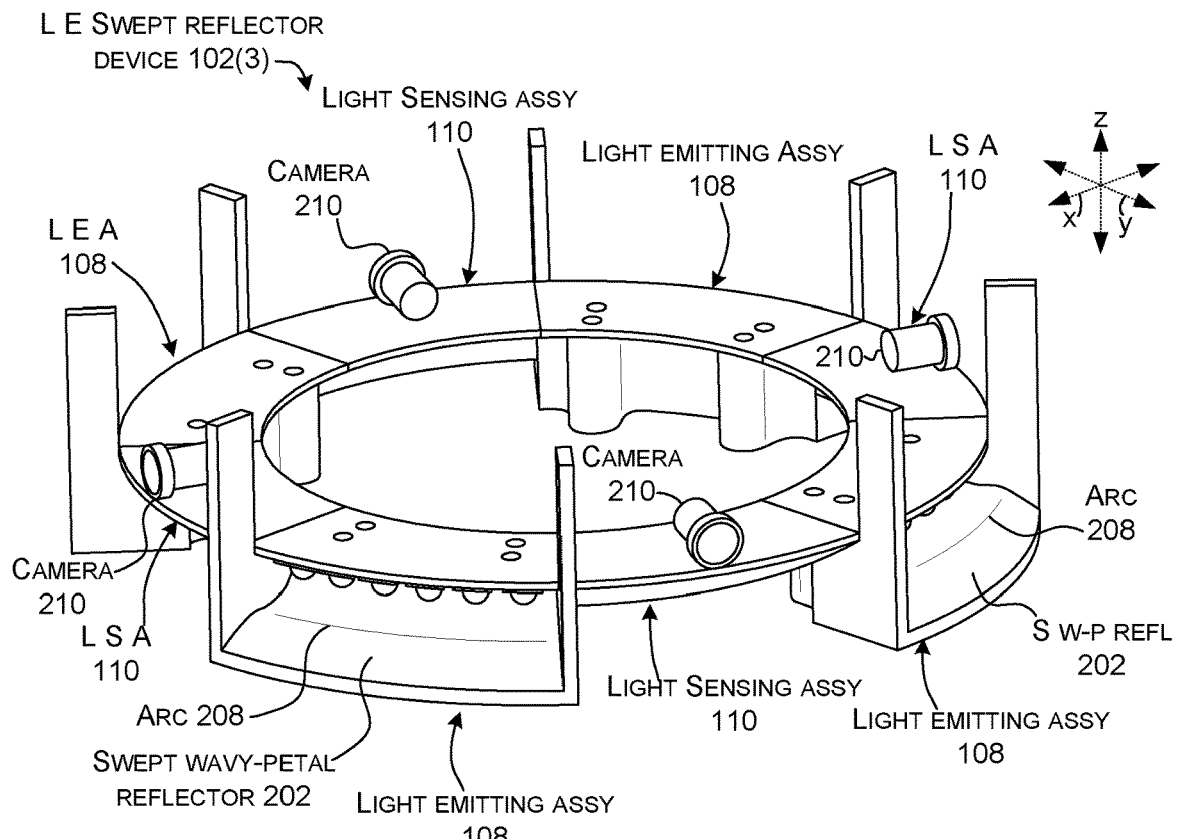
FIGS. 2A, 2B, 3A, and 6A illustrate different perspective views of light-emitting swept-reflector devices and/or swept wavy-petal reflectors, consistent with some implementations of the present concepts.
Figure 2B:
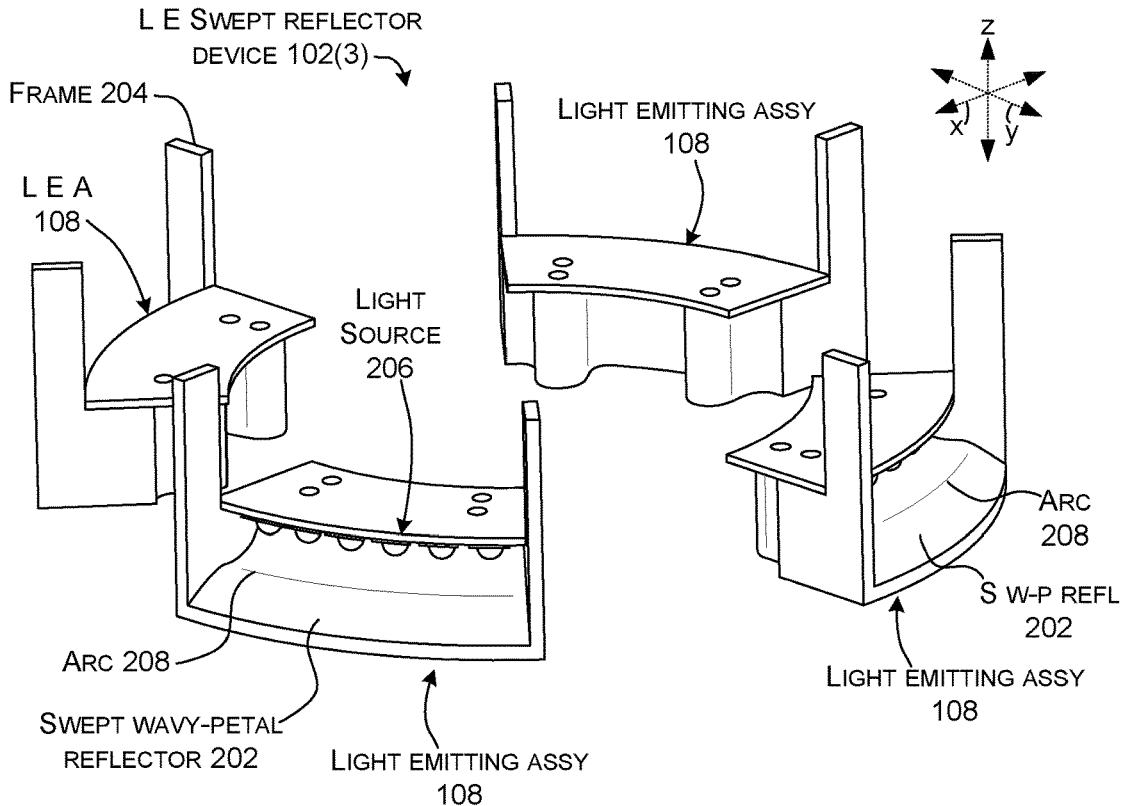

FIGS. 2A-2B collectively show an example light-emitting swept-reflector device 102(3) that is similar to light-emitting swept-reflector device 102(1) introduced above relative to FIG. 1. In this case, the light-emitting swept-reflector device 102(3) includes arcuate light-emitting assemblies 108 and light-sensing assemblies 110. In this example, the light-emitting swept-reflector device 102(3) includes four arcuate light-emitting assemblies 108 and four light-sensing assemblies 110, though other numbers and/or combinations are contemplated. In this implementation, the light-sensing assemblies 110 are interposed between adjacent arcuate light-emitting assemblies 108. Other configurations are contemplated. One such configuration, e.g., a stacked configuration, is illustrated relative to FIGS. 1, 6A, and 6B.

In the implementation illustrated in FIGS. 2A and 2B, individual arcuate light-emitting assemblies 108 can include a swept wavy-petal reflector 202, a frame 204, and a light source 206. The swept wavy-petal reflector 202 can be arcuate as represented by arc 208. The arcuate nature of the swept wavy-petal reflector 202 can define, at least in part, a horizontal distribution pattern of the arcuate light-emitting assembly 108. This aspect is discussed in more detail below relative to FIG. 5. The light-sensing assemblies 110 can include a camera 210 to sense light from the scene.

FIGS. 3A-3F collectively show details of an individual arcuate light-emitting assembly 202. In this example, the light source 206 is manifest as light-emitting diodes (LEDs) 302. In this case, six LEDs are employed per arcuate light-emitting assembly, but other numbers including a single LED can be employed. The LEDs of an individual arcuate light-emitting assembly can be mounted on a single circuit board 304. This aspect is described in more detail below relative to FIGS. 4A and 4B. The arcuate light-emitting assemblies 108 can also enhance the percentage of light from the LEDs that contributes to the FOI by employing end reflectors 306. In this case, the end reflectors are oriented generally orthogonally (e.g., vertically) to the swept wavy-petal reflector 202. The end reflectors 306 can function to reflect light (that may otherwise be wasted) back into the FOI. From one perspective, the combination of the swept wavy-petal reflector 202 and the end reflectors 306 can be viewed as a sectioned-raceway that projects light in a desired or specified field of illumination. Further, the end reflectors can constrain the redirected light to exit within a limited arc width. This aspect can be helpful when placing a camera or vision system adjacent to the emitting region to compartmentalize the illumination output from vision input. This aspect can be especially useful when utilized in conjunction with a cylindrical or curved cover window, where it is desired to reduce/prevent light leakage, backscatter, or ghosting due to light-guiding in the presence of such cover window.

Figure 3A:
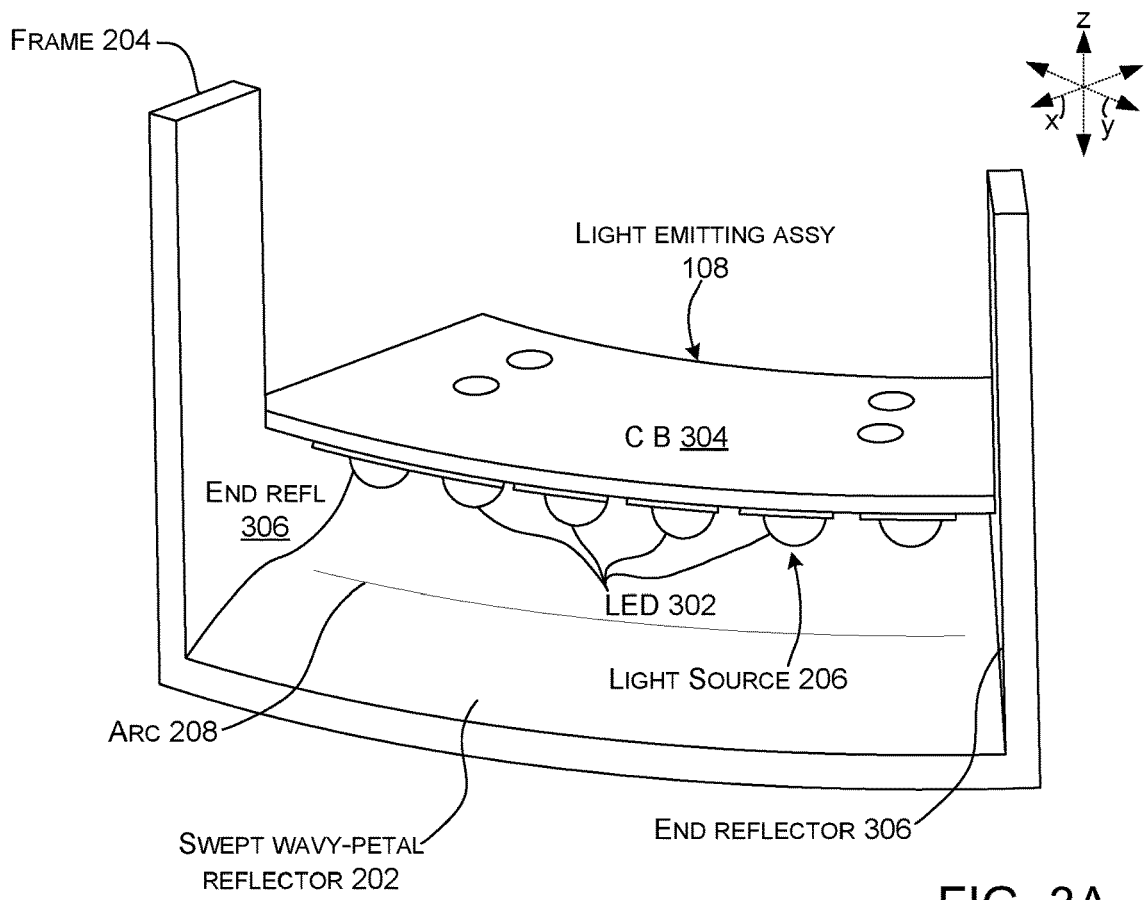
Figure 3B:
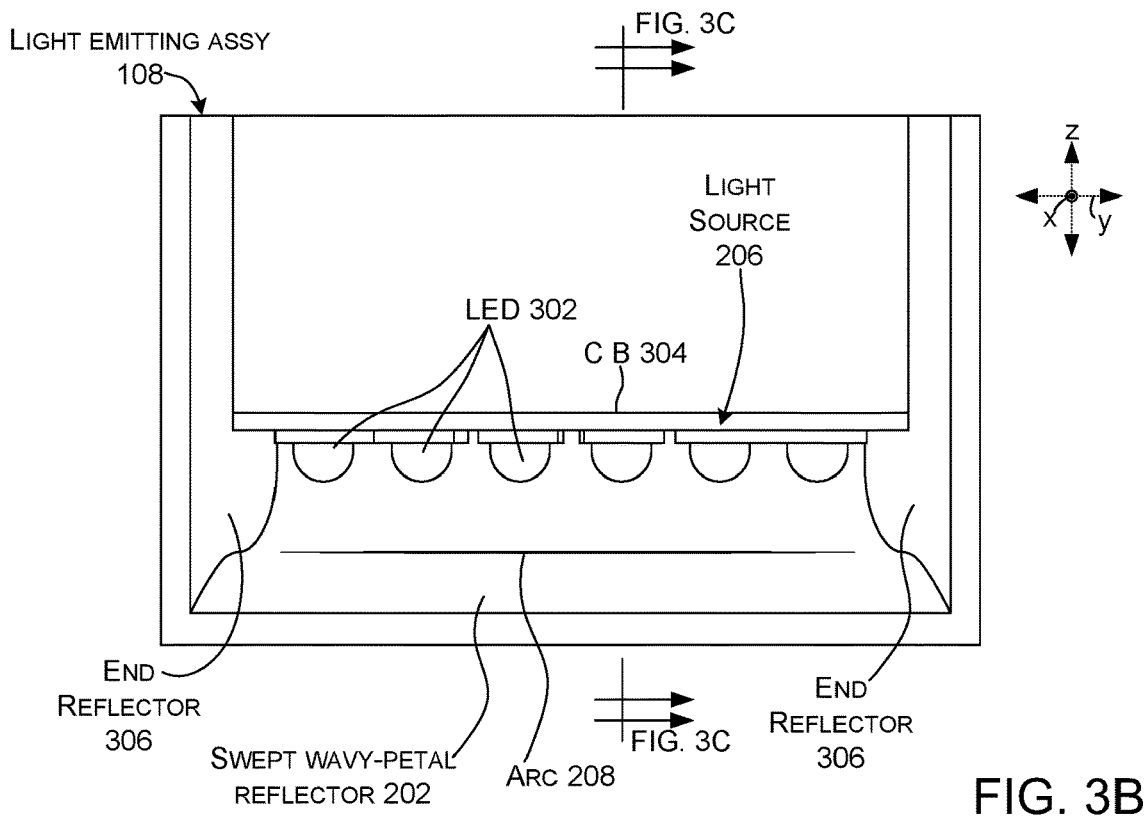
FIG. 3B illustrates a front elevational view of a swept wavy-petal reflector consistent with some implementations of the present concepts.
Figure 3C:
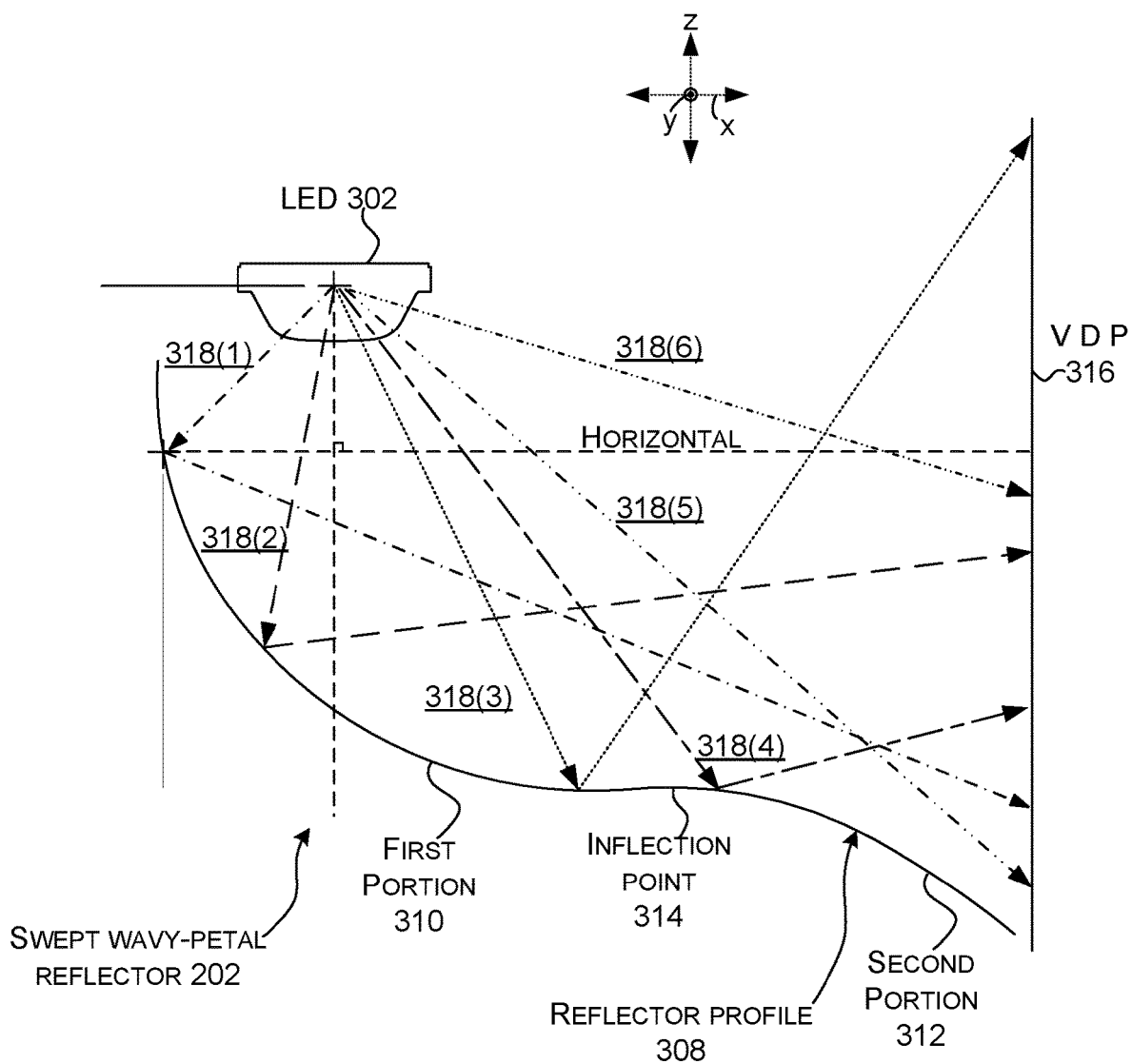
FIGS. 3C-3F illustrate sectional views of example profiles of swept wavy-petal reflectors, consistent with some implementations of the present concepts.

FIG. 3C shows the reflector profile 308 of the swept wavy-petal reflector 202 taken transverse arc 208 as indicated in FIG. 3B. The reflector profile 308 can include a first portion 310 that is proximate to the light source (e.g., in this case the LED 302). The first portion 310 can be separated from a second portion 312 by an inflection point 314. The second portion 312 can be distal to the LED 302 in comparison to the first portion 310. The first portion 310 can have a concave shape (e.g., concave portion) relative to the light source. The second portion 312 can have a convex shape (e.g., convex portion) relative to the light source.

The swept wavy-petal reflector 202 can provide a double sweep of light along the vertical distribution pattern (e.g., radial cross-section) 316 of the FOI (e.g., along the z reference axis). This aspect is represented with six lines or arrows 318 representing light paths from the LED 302 to the vertical distribution pattern 316. (Of course, not all paths can be practically illustrated, but the paths represented by the lines are illustrative). Line 318(1) strikes the swept wavy-petal reflector 202 on the first portion 310 proximate to the LED and is reflected low on the vertical distribution pattern 316. Line 318(2) strikes the swept wavy-petal reflector 202 on the first portion 310 farther from the LED and is reflected toward the middle of the vertical distribution pattern 316. Line 318(3) strikes the swept wavy-petal reflector 202 on the first portion 310 distal from the LED and is reflected near the top of the vertical distribution pattern 316. Line 318(4) strikes the swept wavy-petal reflector 202 on the second portion 312 proximate to the LED and is reflected relatively low on the vertical distribution pattern 316. Line 318(5) misses the swept wavy-petal reflector 202 and strikes low on the vertical distribution pattern 316. Line 318(6) misses the swept wavy-petal reflector 202 and strikes higher on the vertical distribution pattern 316 than line 318(5). Thus, light from the LED 302 can be distributed from low on the vertical distribution pattern to high on the vertical distribution pattern, and back down the vertical distribution pattern. The reflector profile 308 can be adjusted to define the relative density of light in the vertical distribution pattern (e.g., the amount of light that goes low and the amount of light that goes high), such that the angular profile of the radiant intensity along the vertical angular distribution may include a controlled uniformity, when considering the summation of reflected and direct light illuminating the object scene.

In some implementations, the swept wavy-petal reflector 202 can be positioned below and behind the LED 302 where the LED is oriented to generally emit light downwardly. The swept wavy-petal reflector 202 can reflect the emitted light generally horizontally in accordance with the vertical distribution pattern. One technique for determining the reflector profile 308 of the swept wavy-petal reflector 202 is described below relative to FIGS. 3D-3F.

Figure 3D:
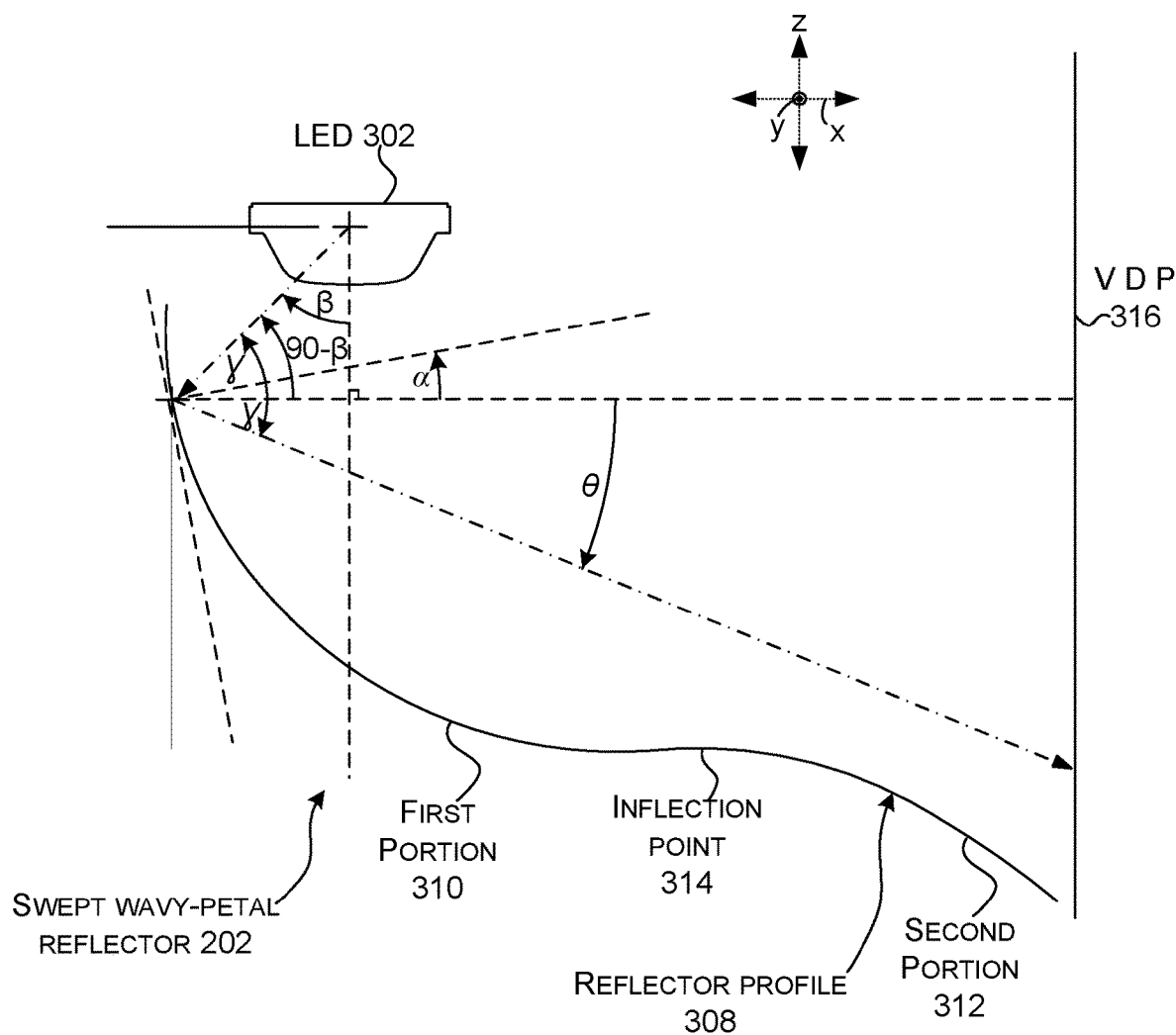

Looking at FIG. 3D, this example technique starts with a bisected angle of reflection as:

$$90-\beta=\gamma+\alpha$$

Thus, $\gamma=90-\beta-\alpha$
And since, $$\theta=\gamma-\alpha$$

The output angle definition becomes:

$$\theta=90-\beta-2\alpha.$$

But since output angle $\theta$ is determined from $\beta$ to $\theta$ energy distribution mapping, the definition can be provided in terms of $\alpha$:

$$\alpha = \frac{(90-\beta-\theta)}{2}.$$

1. Calculate variable $\beta$ steps required to maintain constant energy (or target output profile), from angular distribution (i.e., gaussian profile).
2. Start at $(x_0, y_0)$, determine $\beta_0$ then determine $\alpha_0$, (for $\theta_0$) then project to intersection of $\beta_1$ with $\alpha_1$, at $(x_1, y_1)$.
3. Repeat to form series of points $(x_n, y_n)$.

Figure 3E:
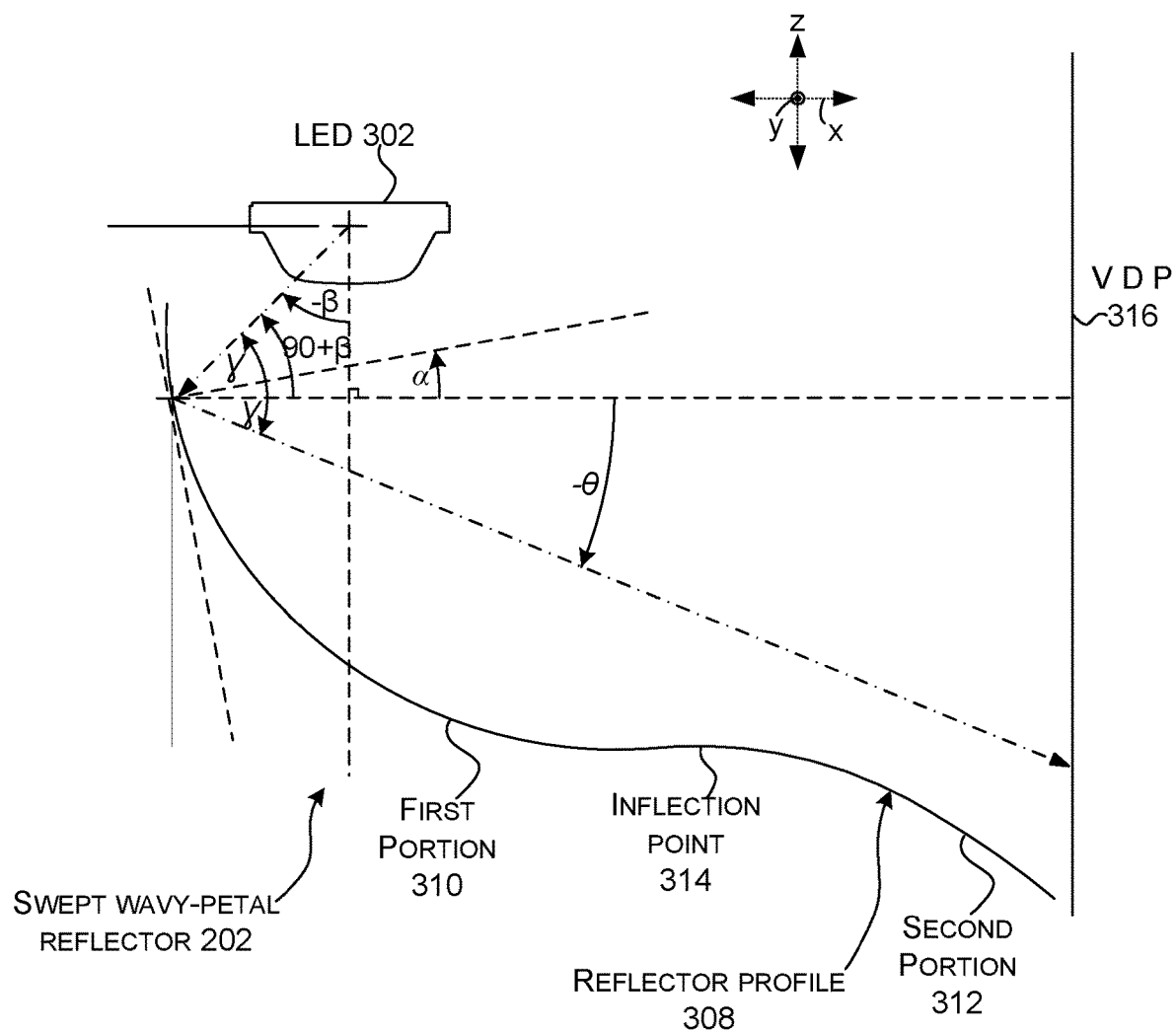

Looking at FIG. 3E, the angle can now be represented as:

$$90+\beta=\gamma-\alpha$$

Thus, $\gamma=90+\beta-\alpha$.
And since, $$\theta=-(\gamma-\alpha)+\alpha-\gamma$$

Output angle definition becomes:

$$\theta=2\alpha-\beta-90.$$

But since output angle $\theta$ is determined from $\beta$ to $\theta$ energy distribution mapping, the definition can be in terms of $\alpha$:

$$\alpha = \frac{(90-\beta-\theta)}{2}$$

1. Calculate variable $\beta$ steps required to maintain constant energy (or target output profile), from angular distribution (i.e., gaussian profile).
2. Start at $(x_0, y_0)$, determine $\beta_0$ then determine $\alpha_0$, (for $\theta_0$) then project to intersection of $\beta_1$ with $\alpha_1$, at $(x_1, y_1)$.
3. Repeat to form series of points $(x_n, y_n)$.

An example calculation method for the source input profile can be as follows:

1. Determine best approximation of real source emission profile (i.e., Gaussian, Super Gaussian, profiled data, etc. . . . ).
2. Sum rows,
3. Convert row-sum profile into angular steps representing constant energy (for uniform profile), or another profile (RI compensation along v),
4. Use this list of angular steps to determine (x,y) intersection points, thus calculate profile.

Looking at FIG. 3F, an example calculation method for the profile points can be as follows:

For line with slope $\alpha_0$ from $(x_0, y_0)$ intersecting line with slope $\beta_1$ to get next points $(x_1, y_1)$, $$m = \tan(\alpha_0 - 90) = \frac{(y_1 - y_0)}{(x_1 - x_0)}.$$

For facet angle $\alpha_0$:

$$y = x\tan(\alpha_0-90)+(y_0-x_0\tan(\alpha_0-90)).$$

For emitted angle $\beta_1$:

$$y = x\tan(90-\beta_1).$$

Intersection occurs at (x,y):

$$x = \frac{y_0 - x_0\tan(\alpha_0 - 90)}{\tan(90 - \beta_1) - \tan(\alpha_0 - 90)}$$

$$y = \tan(90 - \beta1)\frac{y_0 - x_0\tan(\alpha_0 - 90)}{\tan(90 - \beta_1) - \tan(\alpha_0 - 90)}$$

An example method for calculating the inflection point is described below.

Once the series of profile points $(x_n, y_n)$ are determined up to the point representing the maximum target reflector output angle, the swept profile may continue with a reverse sweep or profile. This, in effect, allows more LED light to be captured and reflected into the FOI. Such profile may be continued out to a point where the lowest output angle from the reflector is still allowed to pass the secondary reverse profile. This enables high efficiency to be achieved into the FOI.

Figure 4A:
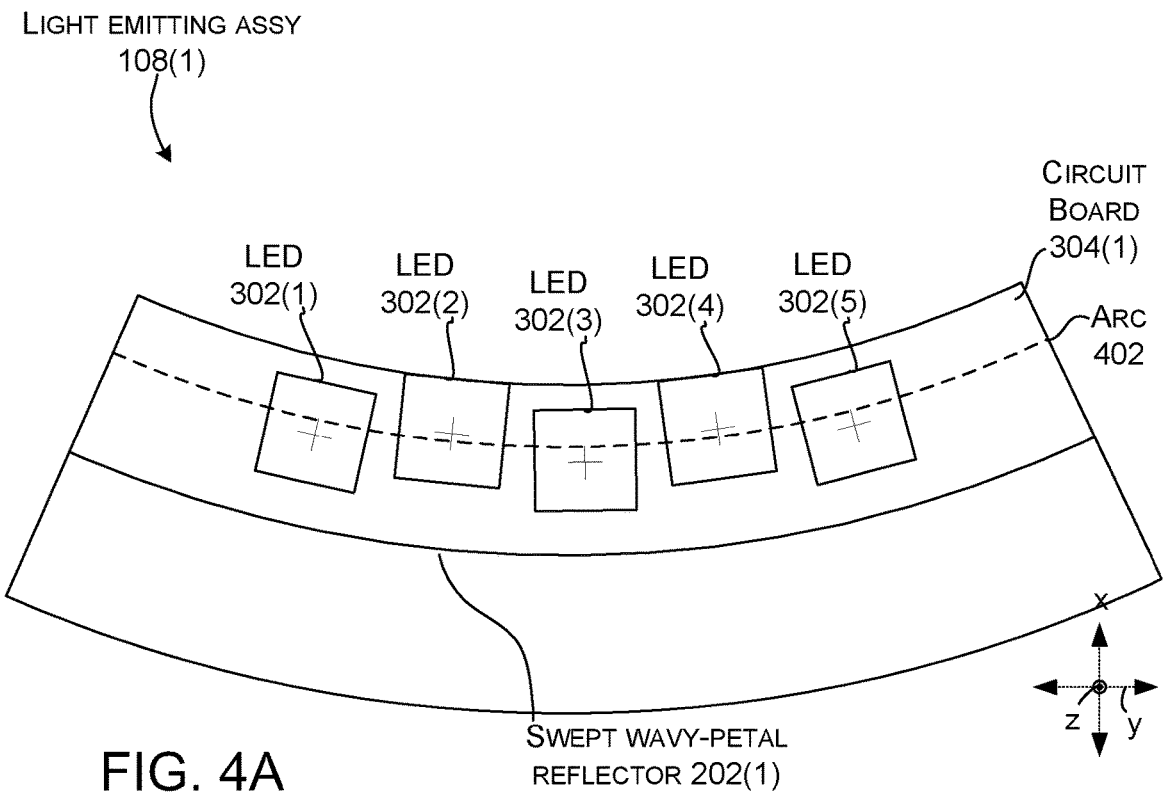
FIGS. 4A, 4B, and 5 illustrate top elevational views of an example swept wavy-petal reflector consistent with some implementations of the present concepts.
Figure 4B:
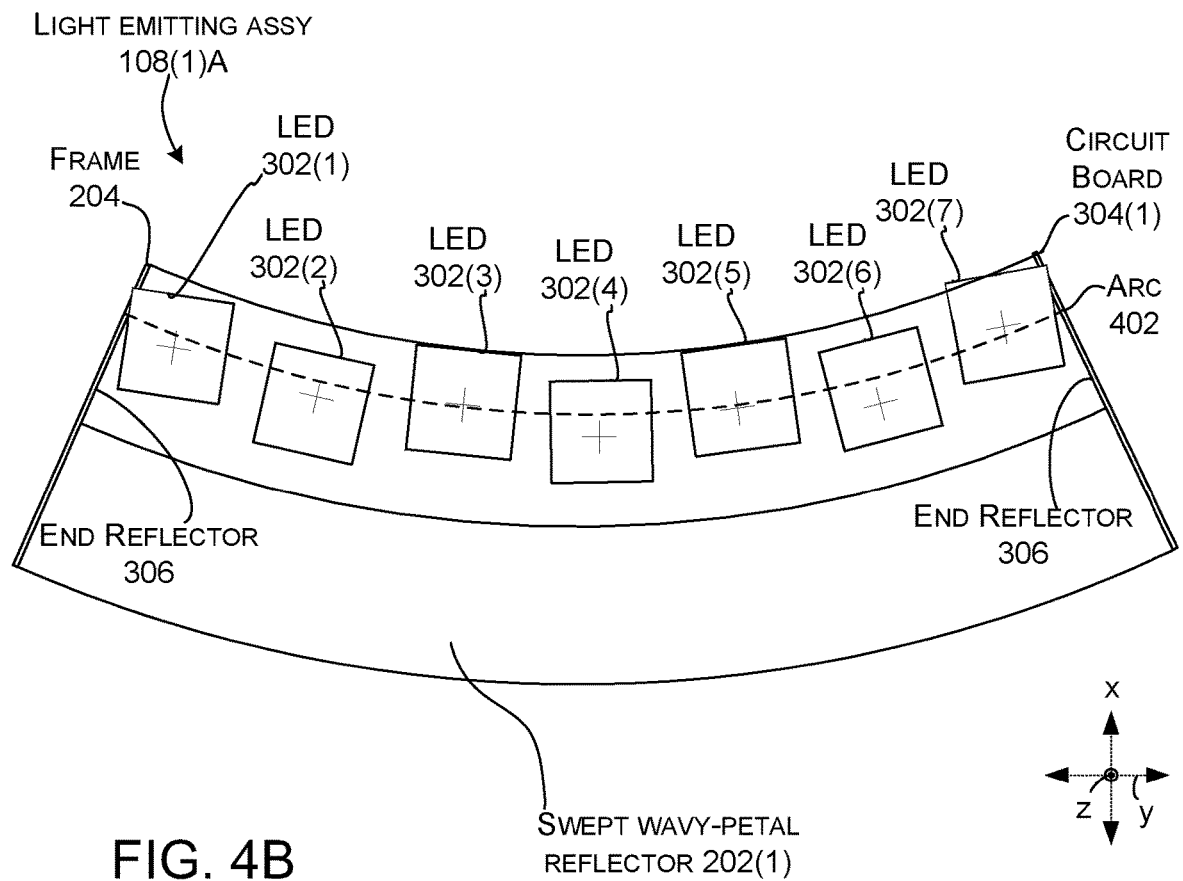

FIGS. 4A and 4B show arcuate light-emitting assemblies 108(1) and 108(1)A that are similar to the arcuate light-emitting assemblies 108 introduced above. The arcuate light-emitting assemblies can include circuit board 304(1) positioned over swept wavy-petal reflector 202(1). In the case of FIG. 4A, the arcuate light-emitting assembly 108(1) includes five LEDs 302(1)-302(5) positioned on a single circuit board 304(1) along an arc (e.g., source arc) 402. However, in this implementation, not all of the LEDs are centered on the arc 402. Instead, in this example, a majority of LEDs 302(1), 302(3), and 302(5) lies outside the arc 402, while the minority of LEDs 302(2) and 302(4) lies inside the arc. This distribution can be considered an example of 'dithering.' Dithering can be viewed as intentional deviation from mean design radius of the arc of the LEDs on the arcuate light-emitting assembly When contrasted with centering each LED along arc 402, dithering can diminish positional tolerance issues by using xy placement on the circuit board 304(1) to reduce or cancel light output variation caused by unintended deviation from specified LED placement. From one perspective, when the device design stipulates that the LEDs are to be centered along the arc 402, any misalignment associated with assembly tolerances may negatively affect the horizontal distribution pattern and/or the vertical distribution pattern. This can result in device to device variability and/or some devices failing quality control (e.g., outside design tolerances). In contrast, designing dithering into the LED positions can allow a higher percentage of devices to satisfy design tolerances even when the actual position of individual LEDs varies from the specified location.

From another perspective, employing dithering can enhance output uniformity. The output uniformity can be especially pronounced when comparing unintentional misalignment that occurs during assembly. Dithering can help facilitate reflector integration toward plug and play in terms of mechanical assembly requirement between the LED circuit board and the swept petal reflector. Note that while dithering can be employed in the implementations illustrated in FIGS. 4A and 4B, other implementations may align the LEDs 302 along the arc 402 or in another manner (e.g., without employing dithering).

In the case of FIG. 4B, the arcuate light-emitting assembly 108(1)A includes seven LEDs 302(1)-302(7) positioned on a single circuit board 304(1)A along an arc 402. In this case, to potentially maximize radiant intensity from the arcuate light-emitting assembly, LEDs 302(1) and 302(7) extend over the edge of the circuit board 304(1)A. In many cases, the LED package may extend slightly larger than the LED light-emitting region. The frame 204 and/or end reflector 306 may include voids or recesses to allow the LEDs 302(1) and/or 302(7) to fit on the swept reflector device while exceeding the dimensions of the circuit board and/or the arcuate light-emitting assembly 108. In so doing, the non-light-emitting portion of the LED package may extend beyond the position of the end the reflector plane, yet utilize light from such end-placed LEDs.

Some implementations can also use alignment features in the frame 204 and the circuit board 304(1) to facilitate plug-and-play alignment of the swept wavy-petal reflector with the LED circuit board 304. For instance, the frame could include vertical alignment pins and the circuit board could include corresponding holes to facilitate properly orienting the circuit board on the frame. Further, the swept wavy-petal reflector part itself may include alignment features, such as pins and a reference plane surface, to facilitate alignment of LEDs to the swept wavy-petal reflector, aligning the LED source arc in the xy plane as well as the LED source z height. Further still, the end reflectors may include alignment features to facilitate placement of end reflectors with the swept wavy-petal reflector, as well as the top light baffle of the frame.

Figure 5:
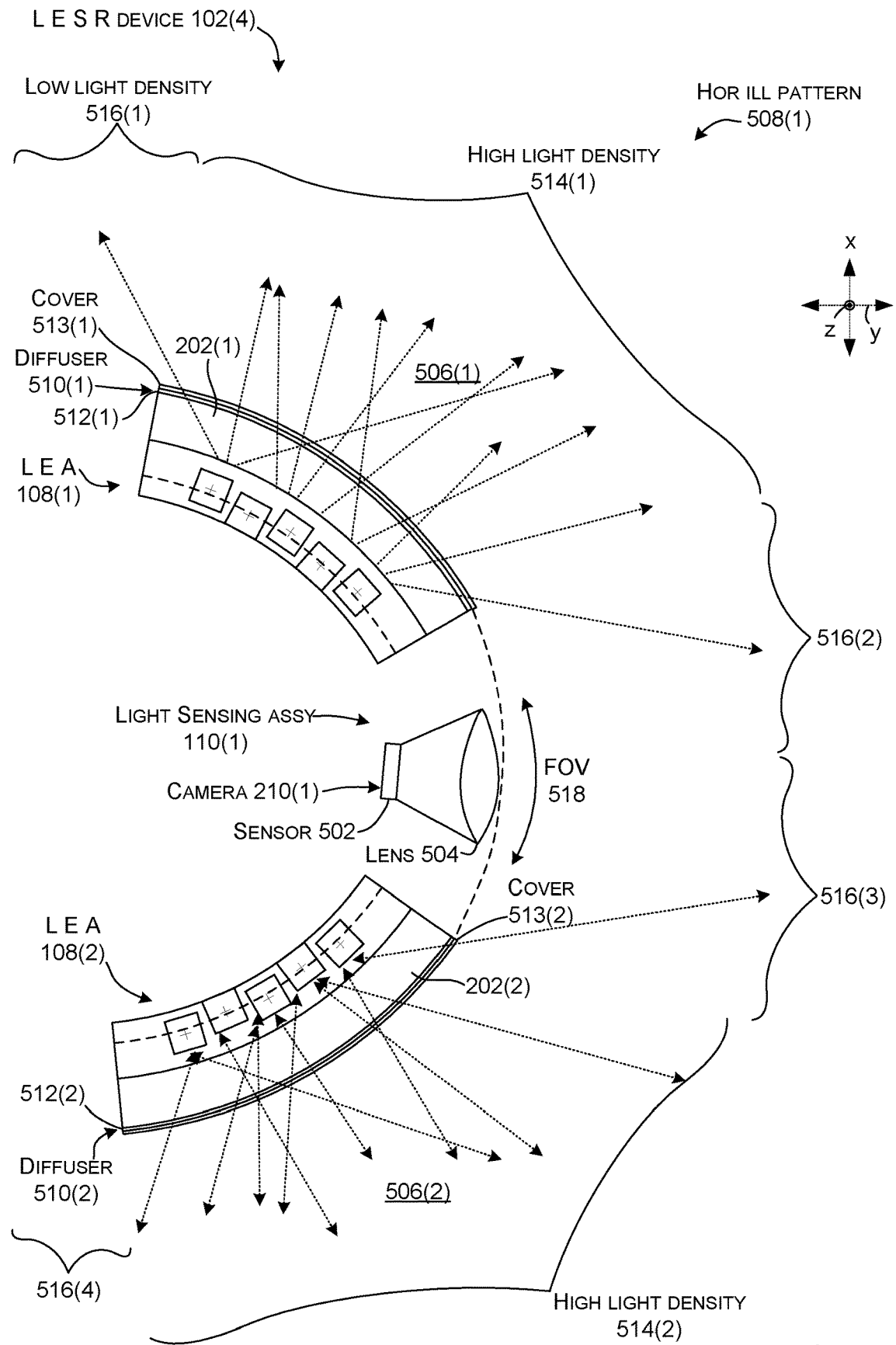

FIG. 5 is an elevational view of a portion of another light-emitting swept-reflector device 102(4). The portion includes a light-sensing assembly 110(1) interposed between arcuate light-emitting assemblies 108(1) and 108(2). The light-sensing assembly 110(1) and the arcuate light-emitting assemblies 108(1) and 108(2) can be arranged in a disc shape along a plane (e.g., the xy-reference plane). The light-sensing assembly 110(1) can include an image sensor 502 and a lens 504.

Arrows 506(1) represent light emitted from arcuate light-emitting assembly 108(1) and arrows 506(2) represent light emitted from arcuate light-emitting assembly 108(2). The arrows 506 can convey the horizontal illumination pattern 508 produced by the swept wavy-petal reflectors 202 of the arcuate light-emitting assemblies 108. As mentioned above, a few representative arrows 506 are illustrated to convey some of the present concepts. It is not feasible to illustrate the high number of emitted light rays.

The horizontal illumination pattern (e.g., horizontal FOI) 508 may be smoothed by the use of diffusers 510 in front of the arcuate light-emitting assemblies 108. For instance, lenticular diffusers 512 that have vertical lenticular grooves (e.g., perpendicular to the xy-reference plane) can smooth light output in the horizontal plane. Stated another way, a horizontally spreading lenticular diffuser (e.g., H-lenticular) can have lenticular grooves aligned along the vertical. Thus, for the plane of the lenticular being vertically aligned, an input beam of light aligned within horizontal plane would be spread in the horizontal direction. Other types of diffusers can be used to affect the light emitted from the arcuate light-emitting assembly.

In the illustrated configuration, the diffusers 510 can be bonded to a cover or window 513. In this case, the window 513 is positioned on the outside relative to the LEDs (e.g., over the diffusers). In other configurations, the cover could be under the diffusers (e.g., the diffusers could be on the outside, away from the LEDs). The cover 513 can be totally or selectively optically transparent. For instance, the cover 513 can be IR light transparent and opaque to visible light, for example. Further, the diffusers 510 may be molded homogeneously as part of the window 513, such as a surface relief diffuser or volume scattering diffuser.

Some implementations can use the swept wavy-petal reflector 202 with diffuser 510 in order to improve system uniformity. For instance, the diffuser can be an H-lenticular thus spreading light in the horizontal direction or a vertical lenticular (V-lenticular) that spreads light in the vertical direction. Alternatively, the diffuser can be a 2D microlens array (MLA) ('2D' connotates spreading in two directions), random MLA, surface relief diffuser, volume scattering diffuser, or other diffuser types, placed relative to the window covering having either cylindrical or curved shape, as one example. In relation to 2D diffusers, various spreading profiles and/or shapes can be employed. For instance, the shapes can include rectangular or oval (stronger spread in one dimension compared to orthogonal dimension). The profiles can have sharp profile roll-off as spread by MLA or smooth roll-off as spread by gaussian diffuser. Volume scattering diffusers spread light into yet another class of profiles. For high angle of incidence (AOI) configurations, such as up to +70 deg into vertical window, a 1D diffuser has less impact from TIR back-scatter and edge roll-off spread losses compared to 2D diffusers.

In this implementation, each arcuate light-emitting assembly's horizontal illumination pattern 508 can include a relatively higher radiant intensity 514 in proximity to and in front of the arcuate light-emitting assembly and relatively lower radiant intensity 516 to the sides. However, with distance from the device, approaching the near (closer) end of working range, the relatively lower radiant intensity 516(2) from arcuate light-emitting assembly 108(1) can angularly overlap with relatively lower radiant intensity 516(3) from arcuate light-emitting assembly 108(2) in front of light-sensing assembly 110(1) to increase the angular uniformity of radiant intensity across the field of illumination. The radiant intensity can illuminate and reflect off targets in the scene within the camera's field of view and thus be available to the camera 210(1). This physical arrangement may also compensate for lens Relative Illumination (RI) roll-off properties of the camera's field of view 518. Lens Relative Illumination roll off means that the camera tends to have greater sensitivity to light entering the camera from low field angles, i.e., view angles near the lens optical axis, and less sensitivity for higher field angles, i.e., view angles farther away from the lens optical axis.

The physical arrangement of light-emitting swept-reflector devices 102(4) can cause higher radiant intensity to be provided (e.g., reflected from the scene) to the camera 210(1) from field angles, or areas, where the camera is less sensitive and relatively less radiant intensity provided (e.g., reflected from the scene) to the camera from field angles, or areas, where the camera is more sensitive, such that the Relative Illumination of the lens, and other possible angular response losses such as image sensor obliquity factor, may be compensated in such way that images of an object appear to have similar grey level response independent of radial position within the FOV of the camera system. This configuration can allow the camera system to obtain uniform images, and thus consistent SNR vs Field Angle, which may provide consistent angular performance for scenarios using machine vision from a radial scene capturing device.

In this implementation, adjacent arcuate light-emitting assemblies 108(1) and 108(2) can support a wide horizontal camera FOV. For instance, in one example, the horizontal field of view of camera 210(1) could be 133 degrees, for example, and the HFOV could be collectively illuminated by the adjacent arcuate light-emitting assemblies 108(1) and 108(2). Further, by combining four arcuate light-emitting assemblies 108 alternating with four light-sensing assemblies 110, (in the manner shown in FIG. 2A) the four light-sensing assemblies can collectively sense the full 360-degree horizontal plane.

Figure 6A:
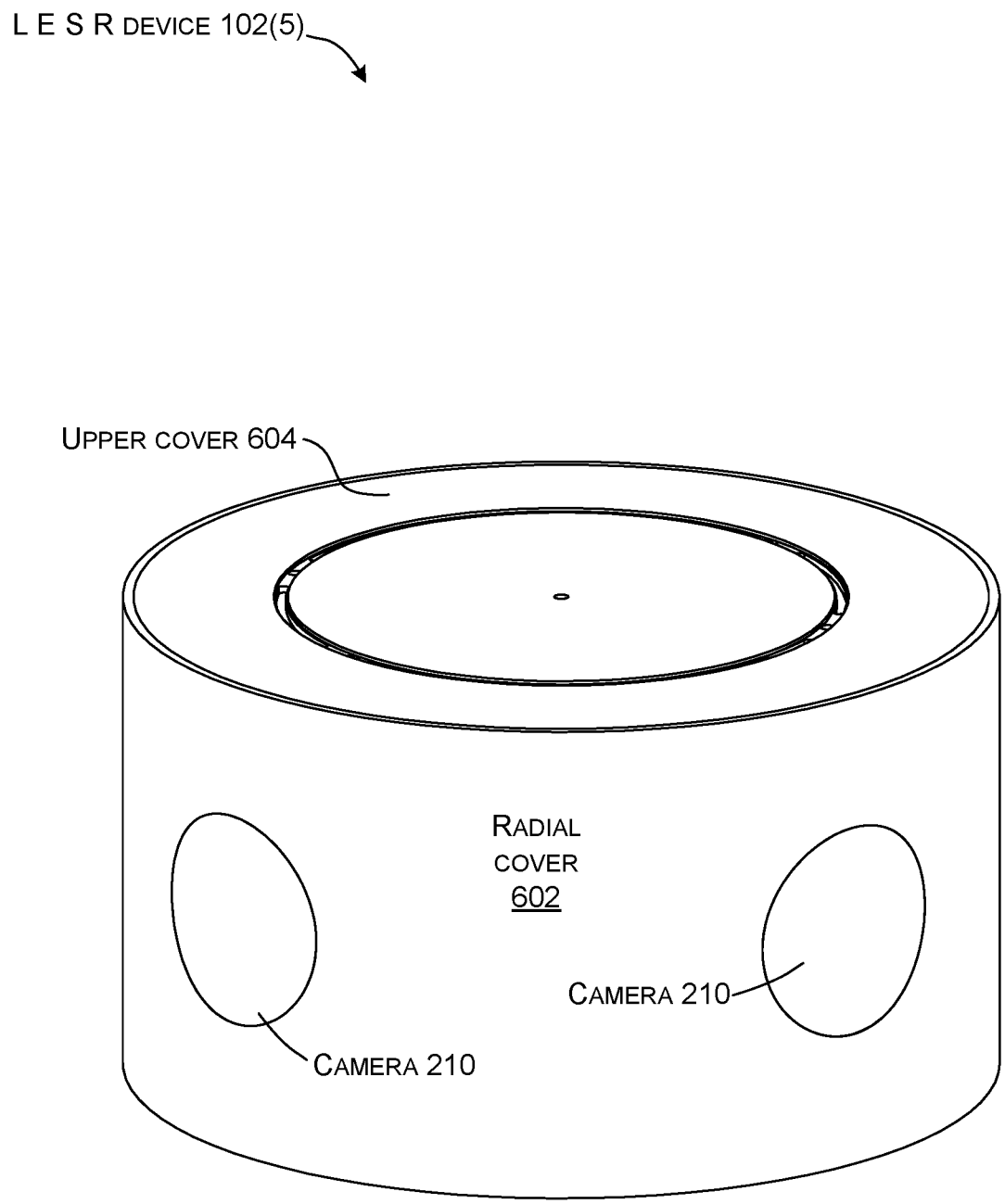
Figure 6B:
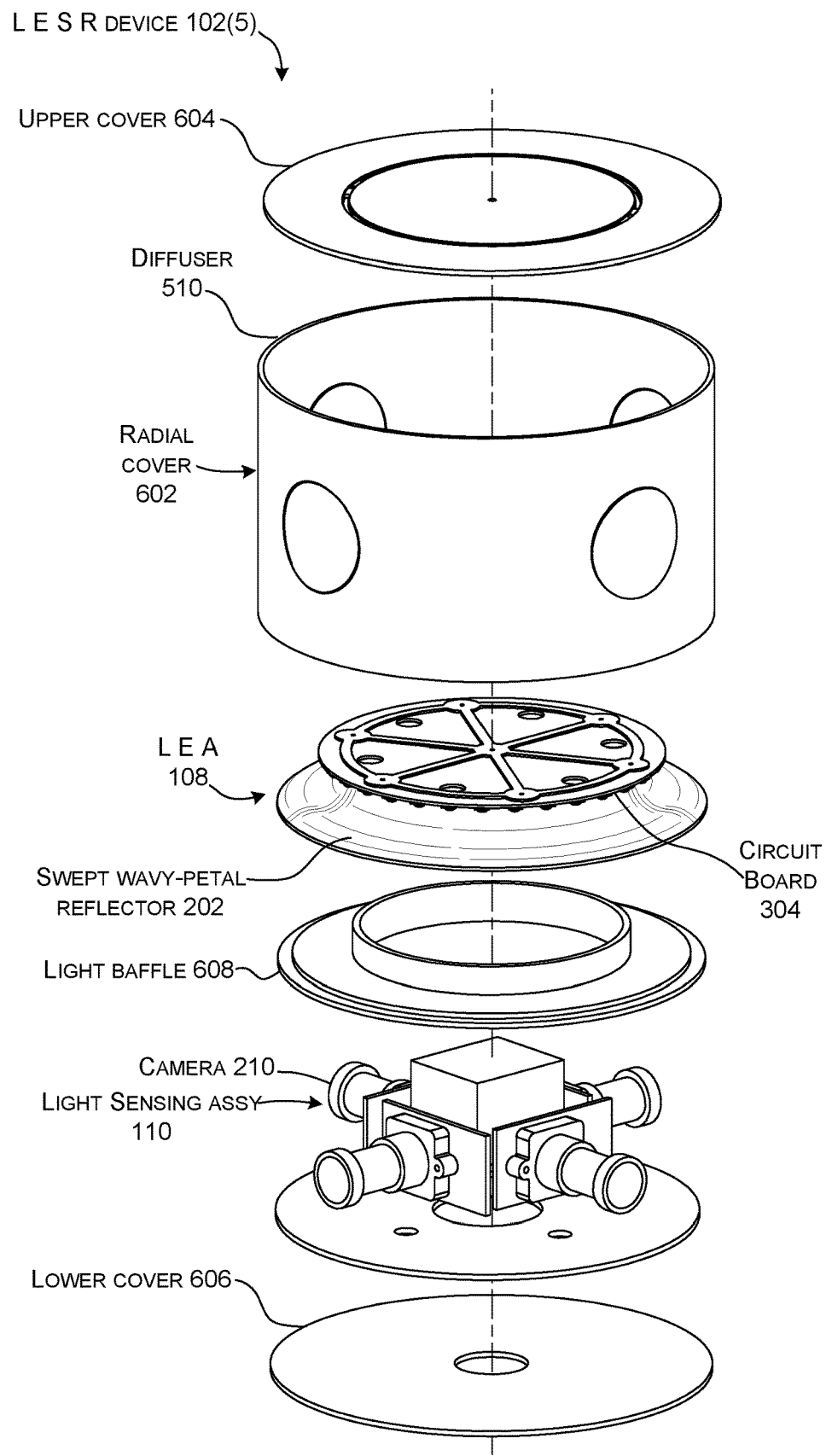
FIG. 6B illustrates an exploded perspective view of the light-emitting swept-reflector device of FIG. 6A, consistent with some implementations of the present concepts.

FIGS. 6A and 6B collectively show another light-emitting swept-reflector device 102(5). This light-emitting swept-reflector device employs a stacked configuration similar to light-emitting swept-reflector device 102(2) of FIG. 1. In this case, a set of the arcuate light-emitting assemblies 108 work cooperatively to illuminate light in a 360-degree pattern along the horizontal plane. From one perspective, this configuration can be viewed as a full raceway that illuminates in all specified horizontal directions up to 360 degrees. A set of light-sensing assemblies 110 that includes cameras 210 can operate cooperatively to sense the 360-degree horizontal plane. From one perspective, the set of arcuate light-emitting assemblies 108 and the set of light-sensing assemblies 110 can be manifest as vertically stacked discs or disc shapes (e.g., arranged radially along a plane).

The cameras 210 and the circuit boards 304 can be electronically coupled to power circuitry and control circuitry (not specifically designated). The control circuitry can cause the arcuate light-emitting assemblies and the light-sensing assemblies to be controlled independently. For instance, IR illumination may be employed only when a user or other object enters the scene. IR light reflected from the object may be used by the control circuitry for various purposes, such as to identify the object/user. Otherwise, the control circuitry may turn off the arcuate light-emitting assemblies and the cameras may sense ambient visible light from objects in the scene.

In this case, the arcuate light-emitting assemblies 108 and the light-sensing assemblies 110 are positioned in a radial cover 602. The radial cover may include a diffuser 510. The radial cover may include cut-outs and/or different materials in front of the cameras than in front of the swept wavy-petal reflectors 202. The arcuate light-emitting swept-reflector device 102(5) can also include an upper cover 604, and a lower cover 606. In this case, a light baffle 608 is positioned between the arcuate light-emitting assemblies 108 and the light-sensing assemblies 110.

The swept wavy-petal reflector concepts described herein can enable light from multiple light-emitting diodes (LEDs) to be redistributed efficiently into a field of illumination (FOI) using a common printed circuit board (PCB) in the form of a look-down LED ring, such as in the example of FIG. 2B. Such combination can enable control of the vertical output profile by design of the reflector profile, while further enabling lens relative illumination (RI) compensation along the horizontal. The concept of LED dithering is introduced relative to FIGS. 4A and 4B. Dithering can help diminish positional tolerance requirements by using xy placement on the common LED board.

Some light-emitting swept-reflector device implementations can employ infrared (IR) or IR 'fill flash' illumination in order to support face detection and authentication, for example. Such illumination can be challenging due to the wide FOI employed to satisfy (e.g., fill) the wide field of view (FOV) of the camera. Various examples can include a single camera supporting near 130-degree HFOV to full 360-degree implementations using one or more cameras. For some implementations, an upward bias angle can be employed to support offset vertical field of view (VFOV) (i.e., −30 degrees to +70 degrees from horizontal, for example).

Simple bunching of LEDs tends not to be efficient, as light outside of the FOV is wasted, or worse, uniformity across the FOV is not achieved. Since high optical power may be needed to support relatively far distance performance of face detection, it can be desirable to limit IR output for safety exposure limit (EL) reasons. Thus, efficient delivery of light into a FOI is potentially key to some applications.

Some implementations can employ a light-emitting swept-reflector device supporting wide FOI and up to 360-degree Illumination coverage capability. For instance, this can allow a full swept 'raceway' implementation, an example of which is shown in FIG. 6B and/or a sectioned-raceway implementation, an example of which is shown in FIG. 2A.

Some implementations can enable a cost-effective method for 360-degree illumination since LEDs can be placed on a common circuit board, thus less circuit boards are required for a given system/device. For instance, in some cases overall assembly tolerances can be better controlled due to a reduced number of components. In other cases, more than one LED can share common reflector costs in terms of physical volume improved (reduced volume, shared surface area).

Figure 3F:
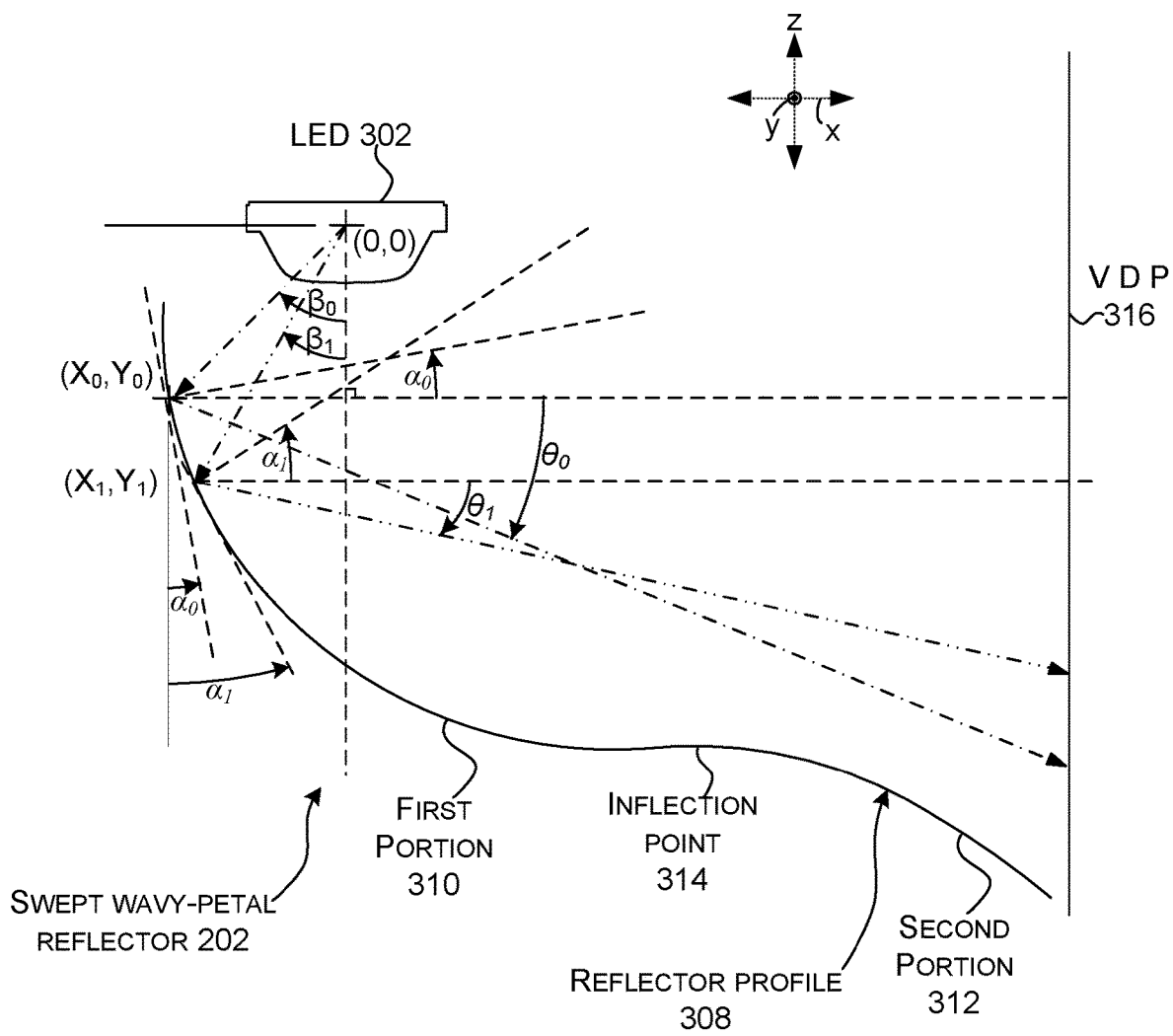

The present concepts can also offer a swept wavy-petal reflector profile calculation method, an example of which is discussed relative to FIGS. 3D-3F. The method can include the ability to achieve various radiant intensity output profiles along the vertical axis and/or the ability to account for an illumination bias angle (e.g., upward bias angle of 20 degrees, such that a horizontally-pointing vertical field of illumination of 100 degrees may thus cover −30 degrees to +70 degrees). Various implementations can employ various output angle profile LEDs, but use of limited half angle LEDs on order of 40 degrees half angle or 80 degrees FWHM has shown to be useful/efficient.

Note also that in light of the explanation above, other configurations can be employed that are consistent with the present concepts. For instance, FIG. 1 shows light-emitting swept-reflector device 102(1) that is configured to sit on a table at a height that is somewhat below the targeted illumination region (e.g., a standing user's head/neck region). As such, this implementation can employ an upward bias angle to its vertical distribution pattern. Similarly, another light-emitting swept-reflector device implementation could be configured to hang from the ceiling and might be above the targeted illumination region. In such a case, the light-emitting swept-reflector device could employ a downward bias angle to its vertical distribution pattern. In some implementations, the bias angle may be chosen such that the device may be utilized both on a table as well as mounted upside down from the ceiling.

Some implementations can employ the 'LED-dithering' concept to reduce positional tolerance requirements as discussed relative to FIGS. 4A-4B. The present concepts can enable the ability to compensate or partially compensate for camera lens RI as discussed relative to FIG. 5. For instance, the compensation can be employed across vertical FOV through reflector profile control.

Alternatively or additionally, the compensation can be employed across the horizontal FOV through varying LED drive current vs position and/or by varying LED spacing along the source arc of the LEDs. The placement of each LED along the source arc can determine the effective outward pointing angle of that LED's output with respect to polar angles within the horizontal from the device. Further, each LED can contribute to an angular envelope or angular intensity profile having a horizontal component of center emission substantially at that pointing angle. Accordingly, the spacing of the LEDs along the source arc can determine the effective summation of such angularly offset intensity profiles, and thus the effective angular intensity profile emitted by the illuminator, or combination of illuminators (e.g., arcuate light-emitting assemblies). By varying the LED spacing along the source arc such that LEDs are closer, higher intensity can be emitted into those pointing angles within the effective summation profile, whereas by increasing the LED spacing, lower intensity can be emitted into those pointing angles within the summation profile. By using substantially the same LED output power and LED emission profile, i.e., use the same type LED with consistent drive current, for the LEDs along the source arc, variation of LED spacing may be directly used to tailor the angular profile of the effective summation profile. Further, by varying drive current for each LED along the source arc, a consistently-spaced angular array of sources along the source arc may be used to tailor the angular profile of the effective summation profile. Any combination of source spacing and drive current variation for each source may be utilized to tailor the effective summation intensity profile.

As mentioned above, some implementations can undercut reflector edges next to the LED PCB in order to fit edges of more LEDs within a given sectioned-raceway wavy-petal reflector as discussed relative to FIG. 4B. Some implementations can add mirror sidewalls for quad mirror walls for the case of the sectioned-raceway wavy-petal reflector as described relative to FIGS. 3A and 3B. Full raceway configurations, such as those illustrated in FIGS. 6A and 6B can be used in conjunction with multiple (e.g., four) cameras, to illuminate for a single frame, thus partial/half-illuminator, by driving only a portion of the LED sources along the source arc to support illumination for a given camera field of view.

Some applications of the present concepts may employ IR or IR 'fill flash' illumination in order to support face detection and authentication. Such illumination is challenging due to wide FOI requirements needed to fill camera wide FOV, from single cameras supporting near 133 degrees of HFOV to full 360-degree applications using one or more cameras. For some applications, an upward bias angle is employed to support offset VFOV (e.g., −30 degrees to +70 degrees from horizontal). The swept wavy-petal reflector concepts described herein can enable light from multiple LEDs to be redistributed efficiently into a desired FOI using a common (flat and rigid) PCB, such as in the form of a look-down LED ring. Stated another way, the LEDs are oriented vertically, but the wavy-petal reflector can cause the light to be emitted horizontally. Such combination can enable control of vertical output profile uniformity by design of wavy-petal reflector profile, while further enabling lens RI compensation along the horizontal.

The concepts described above can be implemented on a range of devices and in a range of scenarios. For instance, the concepts can allow a small, unobtrusive, low profile device to emit light of generally uniform radiant intensity through a desired horizontal range. Further, in some implementations, the radiant intensity can be generally uniform for each vertical slice of the horizontal range. This can be accomplished even when device dimensions are constrained in one or more directions. Further, the summation intensity profile due to one or more illuminators may emit light such that the camera image of a spherical or cylindrical target is substantially uniform, taking into account the camera vignetting and RI roll-off.

In one case, the device may be implemented as a table top video conferencing device that has a range of 360 degrees (e.g., all the way around the table). The device can include light emitters (e.g., LEDs) and reflectors. The reflectors allow light from the LEDs to be delivered uniformly in a desired pattern or profile. In such a case, the light may be visible light and/or light outside the human perceptible range. For instance, IR light may be used to illuminate users around the table without the users being bothered by the light. The light reflected from the users can be captured by image sensors on the device and transmitted to another location where it is used to generate a remote representation of the users (e.g., of the conference room). Alternatively, reflected IR light may be sensed and utilized for various depth and/or identification purposes and/or machine vision, while sensed ambient visible light is transmitted and/or otherwise utilized for visual purposes.

In another case, the device may be wall mounted and have a 180-degree (e.g., wall to wall) horizontal range defined by the arcuate wavy-petal reflectors. The device can offer a higher radiant intensity through the range than is available using other technologies so that objects in the range are illuminated sufficiently and uniformly. This can provide nearly ideal illumination of objects in the band (e.g., FOI) so that sensors can receive their reflection and generate high quality images having sufficient signal to noise ratio.

Various examples are described above. Additional examples are described below. One example includes a device comprising a light source and a swept wavy-petal reflector positioned relative to the light source to cast light from the light source across an angular range including radial cross-sections within the angular range.

Another example can include any of the above and/or below examples where the light source comprises a light-emitting diode (LED) or multiple LEDs, and wherein the light is visible light, IR light, and/or IR light and visible light.

Another example can include any of the above and/or below examples where the swept wavy-petal reflector comprises a concave portion and a convex portion separated by an inflection point.

Another example can include any of the above and/or below examples where the angular range is 360 degrees or wherein the angular range is less than 360 degrees.

Another example can include any of the above and/or below examples where the device is a tabletop video conferencing device and the angular range comprises a field of illumination that includes a horizontal distribution pattern and the radial cross-sections are vertical distribution patterns of the range extending angularly outward from the tabletop video conferencing device.

Another example can include any of the above and/or below examples where the light source and the swept wavy-petal reflector comprise an arcuate light-emitting assembly.

Another example can include any of the above and/or below examples where the device further comprises a light-sensing assembly configured to sense light reflected back toward the device from objects in the angular range.

Another example can include any of the above and/or below examples where the light-sensing assembly is positioned between the arcuate light-emitting assembly and another arcuate light-emitting assembly.

Another example can include any of the above and/or below examples where the light from the arcuate light-emitting assembly and the another arcuate light-emitting assembly angularly overlaps in front of the light-sensing assembly.

Another example can include any of the above and/or below examples where the device further comprises a diffuser positioned over the arcuate light-emitting assembly and the another arcuate light-emitting assembly.

Another example can include any of the above and/or below examples where the diffuser comprises a lenticular.

Another example can include a device comprising a light source and a reflector extending along an arc and oriented in light receiving relation relative to the light source, the reflector having a cross-sectional reflector profile taken transverse to the arc that includes a first portion having a swept profile that transitions to a second portion having a reverse swept profile.

Another example can include any of the above and/or below examples where the light source comprises multiple light sources arranged generally along another arc.

Another example can include any of the above and/or below examples where the multiple light sources are dithered along the another arc.

Another example can include any of the above and/or below examples where the cross-sectional reflector profile of the reflector creates an upward bias angle on light reflected from the light source.

Another example can include a device comprising first and second arcuate light-emitting assemblies and a light-sensing assembly interposed therebetween and the first arcuate light-emitting assembly configured to emit light across a first angular range and the second arcuate light-emitting assembly configured to emit light across a second angular range that angularly overlaps with the first angular range in front of the light-sensing assembly.

Another example can include any of the above and/or below examples where the first and second arcuate light-emitting assemblies comprise four arcuate light-emitting assemblies and the light-sensing assembly comprises four light-sensing assemblies interposed between individual arcuate light-emitting assemblies in alternating order.

Another example can include any of the above and/or below examples where the four arcuate light-emitting assemblies and the four light-sensing assemblies are arranged in a disc shape.

Another example can include any of the above and/or below examples where the first and second arcuate light-emitting assemblies and the light-sensing assembly are positioned radially along a plane, and further comprising a lenticular positioned over the first and second arcuate light-emitting assemblies, the lenticular having lenticular grooves that are oriented parallel to the plane.

Another example can include any of the above and/or below examples where the first and second arcuate light-emitting assemblies and the light-sensing assembly are positioned radially along a plane, and further comprising a lenticular positioned over the first and second arcuate light-emitting assemblies, the lenticular having lenticular grooves that are oriented perpendicular to the plane.

CONCLUSION

Although techniques, methods, devices, systems, etc., pertaining to swept wavy-petal light reflection are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
multiple light sources arranged laterally along a convex arc; and,
a swept wavy-petal reflector which when viewed transverse to the convex arc comprises a first concave portion and a second convex portion and extends laterally along the convex arc and positioned relative to the multiple light source to cast light from the multiple light sources across an angular range including radial cross-sections within the angular range.

2. The device of claim 1, wherein the multiple light sources comprise multiple light-emitting diodes (LEDs) LEDs, and wherein the light is visible light, IR light, and/or IR light and visible light.

3. The device of claim 1, wherein the first concave portion and the second convex portion are separated by an inflection point.

4. The device of claim 1, wherein the angular range is 360 degrees or wherein the angular range is less than 360 degrees.

5. The device of claim 1, wherein the device is a tabletop video conferencing device and the angular range comprises a field of illumination that includes a horizontal distribution pattern and the radial cross-sections are vertical distribution patterns of the range extending angularly outward from the tabletop video conferencing device.

6. The device of claim 1, wherein the multiple light sources and the swept wavy-petal reflector comprise an arcuate light-emitting assembly.

7. The device of claim 6, further comprising a light-sensing assembly configured to sense light reflected back toward the device from objects in the angular range.

8. The device of claim 7, wherein the light-sensing assembly is positioned between the arcuate light-emitting assembly and another arcuate light-emitting assembly.

9. The device of claim 8, wherein the light from the arcuate light-emitting assembly and the another arcuate light-emitting assembly angularly overlaps in front of the light-sensing assembly.

10. The device of claim 9, further comprising a diffuser positioned over the arcuate light-emitting assembly and the another arcuate light-emitting assembly.

11. The device of claim 10, wherein the diffuser comprises a lenticular.

12. A device, comprising:
a light source; and,
a reflector extending along a convex arc relative to a center of the device and oriented in light receiving relation relative to the light source, the reflector having a cross-sectional reflector profile taken transverse to the convex arc that includes a first portion having a swept profile that transitions to a second portion having a reverse swept profile.

13. The device of claim 12, wherein the light source comprises multiple light sources arranged generally along another convex arc, and wherein the convex arc and the another convex arc have the same arc length or wherein the convex arc and the another convex arc have different arc lengths.

14. The device of claim 13, wherein the multiple light sources are dithered along the another convex arc.

15. The device of claim 12, wherein the cross-sectional reflector profile of the reflector creates an upward bias angle on light reflected from the light source.

16. A device, comprising:
first and second arcuate light-emitting assemblies and a light-sensing assembly interposed therebetween; and,
the first arcuate light-emitting assembly configured to emit light across a first angular range and the second arcuate light-emitting assembly configured to emit light across a second angular range that angularly overlaps with the first angular range in front of the light-sensing assembly.

17. The device of claim 16, wherein the first and second arcuate light-emitting assemblies comprise four arcuate light-emitting assemblies and the light-sensing assembly comprises four light-sensing assemblies interposed between individual arcuate light-emitting assemblies in alternating order.

18. The device of claim 17, wherein the four arcuate light-emitting assemblies and the four light-sensing assemblies are arranged in a disc shape.

19. The device of claim 16, wherein the first and second arcuate light-emitting assemblies and the light-sensing assembly are positioned radially along a plane, and further comprising a lenticular positioned over the first and second arcuate light-emitting assemblies, the lenticular having lenticular grooves that are oriented parallel to the plane.

20. The device of claim 16, wherein the first and second arcuate light-emitting assemblies and the light-sensing assembly are positioned radially along a plane, and further comprising a lenticular positioned over the first and second arcuate light-emitting assemblies, the lenticular having lenticular grooves that are oriented perpendicular to the plane.

* * * * *